US010128905B2

(12) United States Patent
Briancon et al.

(10) Patent No.: US 10,128,905 B2
(45) Date of Patent: Nov. 13, 2018

(54) METHOD AND SYSTEM FOR IMPULSIVE NOISE CLASSIFICATION AND MITIGATION

(71) Applicant: Alarm.com Incorporated, Vienna, VA (US)

(72) Inventors: Alain Charles Briancon, Poolesville, MD (US); John Berns Lancaster, Lawrence, KS (US); Curtis Scott Crawford, Overland Park, KS (US); Robert Leon Lutes, Lawrence, KS (US); Eric Alexander Shumaker, Lawrence, KS (US); Marc Anthony Epard, Lawrence, KS (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 13/927,387

(22) Filed: Jun. 26, 2013

(65) Prior Publication Data

US 2013/0343443 A1    Dec. 26, 2013

Related U.S. Application Data

(60) Provisional application No. 61/664,243, filed on Jun. 26, 2012.

(51) Int. Cl.
*H04B 3/46* (2015.01)

(52) U.S. Cl.
CPC .................... *H04B 3/46* (2013.01)

(58) Field of Classification Search
CPC .... H04B 3/46; H04B 3/11; H04B 3/32; H04L 1/20

(Continued)

(56) References Cited

U.S. PATENT DOCUMENTS 4,272,846 A * 6/1981 Muratani ................ H04B 1/12
                                                    381/94.2
5,265,042 A * 11/1993 Smith, Jr. .......... H03H 17/0261
                                                    708/301

(Continued)

FOREIGN PATENT DOCUMENTS

| WO | 2011056238 A1 | 5/2011 | |
|---|---|---|---|
| WO | WO 2013169228 A1 * | 5/2012 | ............... H04L 1/20 |
| WO | WO 2013169228 A1 * | 11/2013 | ............ H04L 1/0009 |

OTHER PUBLICATIONS

Stoica, L. et al, "A Low-Complexity Noncoherent IR-UWB Transceiver Architecture With TOA Estimation," Microwave Theory and Techniques, IEEE Transactions on, vol. 54, No. 4, pp. 1637-1646, Jun. 2006.*

(Continued)

*Primary Examiner* — Berhanu Tadese
(74) *Attorney, Agent, or Firm* — Fish & Richardson P.C.

(57) ABSTRACT

A system for classifying impulsive noise on a communications signal comprises an impulse signal generator, an integrator, a first comparator, and an impulse peak detector. The impulse signal generator receives a communications signal that includes impulsive noise and is configured to provide an impulse signal that includes just the impulsive noise. The integrator receives the impulse signal and integrates the impulse signal to determine the power of the impulse signal. The first comparator receives the impulse signal and is configured to compare the impulse signal to a first reference signal and indicate the time during which the value of the impulse signal is greater than the value of the first reference signal. The impulse peak detector receives the impulse signal and is configured to process the impulse signal, compare the processed signal to a second reference signal, and detect the peak value of the impulse signal.

14 Claims, 3 Drawing Sheets

(58) Field of Classification Search
USPC .......................................................... 375/224
See application file for complete search history.

(56) References Cited

U.S. PATENT DOCUMENTS

| | | | | |
|---|---|---|---|---|
| 5,416,798 | A * | 5/1995 | Hirose | G01R 19/003 375/227 |
| 5,479,440 | A * | 12/1995 | Esfahani | H03H 21/0012 375/346 |
| 6,122,332 | A * | 9/2000 | Ogata | H03G 3/345 327/310 |
| 7,978,756 | B2 * | 7/2011 | Samdani | H04B 3/487 375/227 |
| 8,428,225 | B2 | 4/2013 | Cioffi et al. | |
| 8,892,430 | B2 * | 11/2014 | Tanaka | G10L 21/0208 375/219 |
| 8,990,284 | B2 * | 3/2015 | Nikitin | G06G 7/1928 708/819 |
| 2003/0099287 | A1 * | 5/2003 | Arambepola | H03G 3/345 375/227 |
| 2004/0052314 | A1 * | 3/2004 | Copeland | H04B 1/707 375/296 |
| 2004/0243659 | A1 * | 12/2004 | Nikitin | G06G 7/02 708/819 |
| 2006/0198430 | A1 * | 9/2006 | Rhee | H04B 3/46 375/222 |
| 2006/0253512 | A1 * | 11/2006 | Nikitin | 708/400 |
| 2008/0075157 | A1 * | 3/2008 | Allen | H04B 17/345 375/227 |
| 2008/0165838 | A1 * | 7/2008 | Vanderhaegen | H04L 1/0009 375/224 |
| 2009/0016469 | A1 * | 1/2009 | Li | H03M 13/3707 375/341 |
| 2009/0141840 | A1 * | 6/2009 | Twitto | H04L 1/0045 375/346 |
| 2009/0259709 | A1 * | 10/2009 | Nikitin | G06G 7/02 708/801 |
| 2009/0323903 | A1 * | 12/2009 | Cioffi | H04B 1/1027 379/32.01 |
| 2010/0061437 | A1 * | 3/2010 | Samdani | H04B 3/46 375/227 |
| 2011/0112784 | A1 * | 5/2011 | Nikitin | H03H 11/0405 702/70 |
| 2011/0142174 | A1 * | 6/2011 | Park | H04B 1/7183 375/340 |
| 2012/0134397 | A1 * | 5/2012 | Cioffi | H04L 12/2856 375/222 |
| 2013/0297665 | A1 * | 11/2013 | Nikitin | G06G 7/1928 708/300 |
| 2013/0339418 | A1 * | 12/2013 | Nikitin | G01R 29/02 708/819 |
| 2013/0343443 | A1 * | 12/2013 | Briancon | H04B 3/46 375/224 |
| 2014/0126675 | A1 * | 5/2014 | Monsen | H04B 1/10 375/350 |
| 2014/0142878 | A1 * | 5/2014 | Briancon | H04B 1/30 702/64 |
| 2014/0195577 | A1 * | 7/2014 | Nikitin | H03H 7/0153 708/304 |
| 2017/0103771 | A1 * | 4/2017 | Ma | G10L 21/0232 |

OTHER PUBLICATIONS

Spieler H,, "Pulse Processing and Analysis," IEEE NPSS Short Course, Nov. 10-11, 2002.*

Article entitled: "On the interchannel interference in digital communication systems, its impulsive nature, and its mitigation" by: Alexei V. Nikitin; Published in EURASIP Journal on Advances in Signal Processing 2011, 2011:137; Publication date: Dec. 12, 2011.

* cited by examiner

METHOD AND SYSTEM FOR IMPULSIVE NOISE CLASSIFICATION AND MITIGATION

RELATED APPLICATIONS

The current non-provisional patent application claims priority benefit, with regard to all common subject matter, of an earlier-filed U.S. provisional patent application titled "METHOD AND APPARATUS FOR DSL IMPULSIVE NOISE CLASSIFICATION AND MITIGATION", Application Ser. No. 61/664,243, filed Jun. 26, 2012. The earlier-filed application is hereby incorporated by reference into the current application in its entirety.

BACKGROUND OF THE INVENTION

Field of the Invention

Embodiments of the current invention relate to methods and systems to detect, classify, and mitigate impulsive noise.

Description of the Related Art

Telecommunications companies are providing subscribers an increasing number of services, such as voice, video, data, high definition television (HDTV), and interactive gaming. In some instances, these services may be offered over existing telephone lines that provide plain old telephone service (POTS). The lines may include cables that run from the service provider's central office or exchange to the subscriber's premises. Each cable may include up to one hundred copper twisted pair wires, wherein the twisted pairs may be unshielded (UTP) or shielded (STP) and each wire may be 24 or 26 gauge. One or more UTPs may connect to each subscriber's house.

The services may be provided using digital subscriber line or digital subscriber loop (DSL) type protocols, such as asymmetric DSL (ADSL), high data rate DSL (HDSL), integrated services digital network (ISDN) DSL (IDSL), rate adaptive DSL (RADSL), symmetric DSL (SDSL), symmetric high speed DSL (SHDSL), very high speed DSL (VDSL), and the like. The bandwidth associated with these protocols may be up to 30 megahertz (MHz), which supplies downstream data rates to the subscriber ranging from 1.5 megabits per second (Mbps) in the case of ADSL to 150 Mbps in the case of VDSL or VDSL2. The loop distances for these protocols may range from about 3.7 kilometers for lower data rate protocols to about 300 meters for higher data rate protocols.

Signals providing the services from the telecommunications company may be received by a modem in the subscriber's household. The modem typically receives power from a household power line. The signals, supplied at high data rates over unshielded wires, are susceptible to noise interference which degrades the performance of the DSL services. Sources of noise may include crosstalk from other DSL signals, radio ingress of AM or amateur radio stations, thermal noises in the line or receiver analog components, electromagnetic couplings of signals from twisted pair wires (used for household power line) associated with the DSL, various appliances at the home (such as hair dryers, vacuum cleaners, light switches, nearby computers, and garage door openers), electrical power supply units for laptop or desktop computers, routers, televisions and other entertainment electronics, internal power and telecommunication cables that run close together, and the like. The noise from these sources can be time variable, relatively stationary, impulsive, or combinations thereof.

Impulsive noise may be a bursty noise event, typically of electromagnetic origin, with potentially high amplitude in voltage, current, or power but limited in duration. Impulsive noise is inherently difficult to characterize and filter out without impacting the characteristics and quality of the underlying signals, but may be characterized statistically through its amplitudes, duration, inter-arrival times, and frequency spectrum. Proper characterization of impulsive noise is important to help identify and possibly eliminate the source of the noise.

SUMMARY OF THE INVENTION

Embodiments of the current invention solve the above-mentioned problems and provide a distinct advance in the art of impulsive noise classification. More particularly, embodiments of the invention provide a system for determining characteristics of impulsive noise in a communications signal that may be analyzed to shield, filter, shape, or eliminate the impulsive noise.

A first embodiment of the invention provides a system for classifying impulsive noise on a communications signal. The system comprises an impulse signal generator, an integrator, a first comparator, and an impulse peak detector. The impulse signal generator receives a communications signal that includes impulsive noise and is configured to provide an impulse signal that includes just the impulsive noise. The integrator receives the impulse signal and integrates the impulse signal to determine the power of the impulse signal. The first comparator receives the impulse signal and is configured to compare the impulse signal to a first reference signal and indicate the time during which the value of the impulse signal is greater than the value of the first reference signal. The impulse peak detector receives the impulse signal and is configured to process the impulse signal, compare the processed signal to a second reference signal, and detect the peak value of the impulse signal.

A second embodiment of the invention provides an impulsive noise filter for filtering impulsive noise in a communications signal. The impulsive noise filter comprises a comparator, a mixer, a monotonic transfer function component, and a latched integrator. The comparator receives a communications signal, an impulse filtered signal, and a first control signal, and is configured to compare the communications signal and the impulse filtered signal and provide a difference signal. The mixer receives the difference signal and a second control signal and is configured to change the frequency of the difference signal and provide a mixed signal. The monotonic transfer function component receives the mixed signal and is configured to determine the magnitude of the mixed signal and provide a transfer function signal. The latched integrator receives the transfer function signal and is configured to suppress transient characteristics of the transfer function signal and provide the impulse filtered signal.

A third embodiment of the invention provides an impulse signal generator for isolating impulsive noise in a communications signal. The impulse signal generator comprises a first impulsive noise filter, a linear filter, and a subtractor. The first impulsive noise filter receives a communications signal, a first control signal, and a second control signal, and is configured to filter out the impulsive noise included in the communications signal and provide a first impulse filtered signal. The linear filter receives the communications signal and is configured to filter out non-impulsive noise included in the communications signal and provide a linear filtered signal. The subtractor receives the impulse filtered signal and the linear filtered signal and is configured to provide the difference between the impulse filtered signal and the linear filtered signal.

A fourth embodiment of the invention provides an impulse power detector for detecting a power of impulsive noise in a communications signal. The impulse power detector comprises an impulsive noise filter, a linear filter, a subtractor, and an integrator. The impulsive noise filter receives a communications signal and is configured to filter out the impulsive noise included in the communications signal and provide an impulse filtered signal. The linear filter receives the communications signal and is configured to filter out non-impulsive noise included in the communications signal and provide a linear filtered signal. The subtractor receives the impulse filtered signal and the linear filtered signal and is configured to provide an impulse signal being the difference between the impulse filtered signal and the linear filtered signal. The integrator receives the impulse signal and is configured to integrate the impulse signal to determine the power of the impulse signal.

A fifth embodiment of the invention provides an impulse timing generator for determining time based characteristics of impulsive noise in a communications signal. The impulse timing generator comprises an impulsive noise filter, a linear filter, a subtractor, and a first comparator. The impulsive noise filter receives a communications signal and is configured to filter out the impulsive noise included in the communications signal and provide an impulse filtered signal. The linear filter receives the communications signal and is configured to filter out non-impulsive noise included in the communications signal and provide a linear filtered signal. The subtractor receives the impulse filtered signal and the linear filtered signal and is configured to provide an impulse signal being the difference between the impulse filtered signal and the linear filtered signal. The first comparator receives the impulse signal and is configured to compare the impulse signal to a first reference signal and indicate the time during which the value of the impulse signal is greater than the value of the first reference signal.

A sixth embodiment of the invention provides an impulse peak detector for detecting a peak value of impulsive noise in a communications signal. The impulse peak detector comprises an impulse signal generator, a bimodal pulse shaper, a second comparator, a third comparator, and an AND gate. The impulse signal generator receives a communications signal that includes impulsive noise and is configured to provide an impulse signal that includes just the impulsive noise. The bimodal pulse shaper receives the impulse signal and is configured to shape the impulse signal and produce an output waveform that includes two components. The second comparator receives the output waveform and the second reference signal and is configured to compare the output waveform to the second reference signal and provide a first output. The third comparator receives the impulse signal and a third reference signal and is configured to compare the output waveform to the second reference signal and provide a second output. The AND gate receives the first output and the second output and is configured to provide the impulse peak signal indicating the peak of the impulsive noise.

A seventh embodiment of the invention provides a system for determining an impulsive noise probability density function of impulsive noise in a communications signal. The system comprises a plurality of impulsive noise filters. The impulsive noise filters receive a communications signal and a plurality of control signals and provide a plurality of quantile value outputs that indicate a level of the impulsive noise in the communications signal. Each filter receives the communications signal and at least one control signal. Each filter includes one quantile value output and configured to assert the quantile value output based on the level of the impulsive noise, wherein the level is determined by the at least one control signal.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
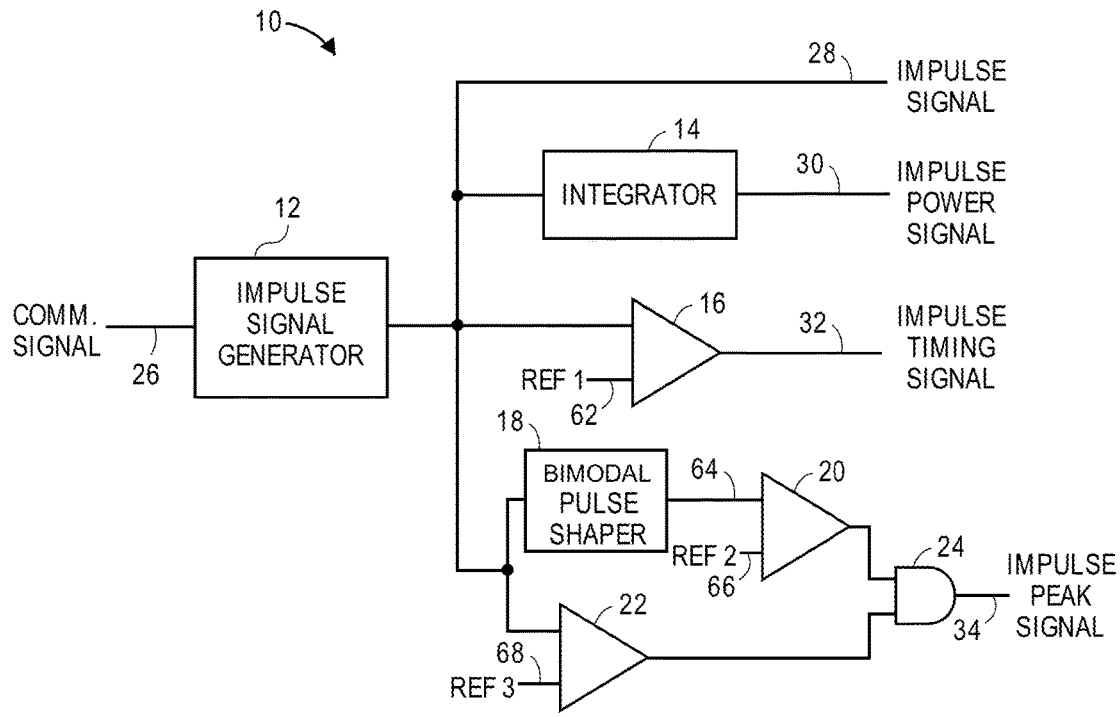
FIG. 1 is a schematic block diagram of a system for classifying impulsive noise, as constructed in accordance with various embodiments of the current invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

A system 10 for classifying and mitigating impulsive noise, constructed in accordance with various embodiments of the current invention, is shown in FIG. 1. The system 10 may be utilized with components, such as a modem, that receive a communications or sensor signal which may be subjected to impulsive noise to help mitigate the noise. The system 10 may additionally or alternatively be utilized in a particular setting to classify the impulsive noise that is present in a communications or sensor signal. In such a case, one or more outputs from the system 10 may be provided to external components that perform analysis of the outputs to help identify sources of the impulsive noise. Using the analysis, the impulsive noise sources may be shielded, filtered, shaped, or eliminated.

In this application, the system 10 is discussed as working with digital subscriber line (DSL) components and protocols. DSL may provide services such as Internet access using existing telecommunications wiring networks. The communications signal provided with DSL service is typically packet based, wherein each packet includes a header portion with routing information and a data portion with data that may represent text, graphics, audio, video, etc. However, use of the system 10 with DSL technology is merely exemplary, and the system 10 may work with any components and protocols in which impulsive noise is an issue.

The system 10 may generally be implemented in hardware, firmware, software, or combinations thereof. The system 10 may broadly comprise an impulse signal generator 12, an integrator 14, a first comparator 16, a bimodal pulse shaper 18, a second comparator 20, a third comparator 22, and an AND gate 24. The system 10 may receive a communications signal 26 and may output an impulse signal 28, an impulse power signal 30, an impulse timing signal 32, and an impulse peak signal 34.

Figure 2:
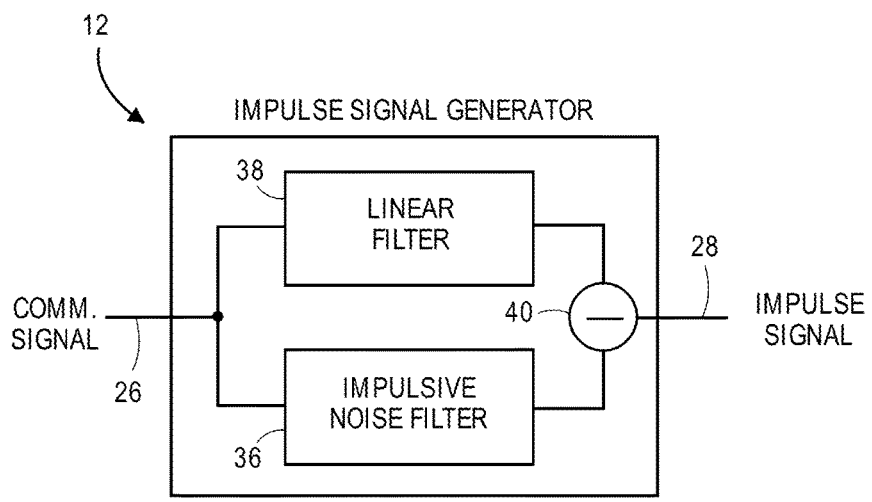
FIG. 2 is a schematic block diagram of a first embodiment of an impulse signal generator that is part of the system of FIG. 1.

The impulse signal generator 12, as shown in FIG. 2, generally isolates the impulsive noise that is present in the communications signal 26 and outputs the impulsive noise as the impulse signal 28. The impulse signal generator 12 may include an impulsive noise filter 36, a linear filter 38, and a subtractor 40.

Figure 3:
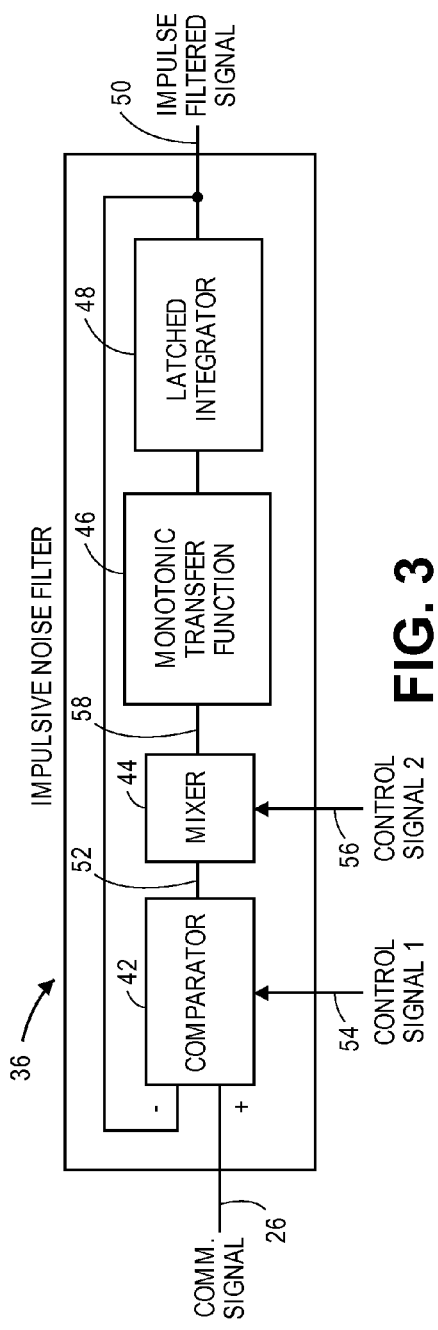
FIG. 3 is a schematic block diagram of an impulsive noise filter that is part of the system of FIG. 1.

The impulsive noise filter 36, as shown in FIG. 3, generally filters out impulsive noise and/or reduces the power of the impulsive noise from a signal and may include a comparator 42, a mixer 44, a monotonic transfer function component 46, and a latched integrator 48. The impulsive noise filter 36 may receive the communications signal 26 as an input and may produce an impulse filtered signal 50 as an output.

The comparator 42 generally compares two signals and produces an output that is the difference between the two. The comparator 42 may also form a first subsystem. The comparator 42 may include a positive input to which the communications signal 26 is connected and a negative input to which the impulse filtered signal 50 is connected. The comparator 42 may output a difference signal 52 corresponding to the communications signal 26 minus the impulse filtered signal 50. The comparator 42 may also receive an optional first control signal 54, which is generally a known reference signal from within the system 10 or generated external to the system 10. The first control signal 54 may have a direct current (DC) voltage or an alternating current (AC) voltage or may be periodic in nature with a constant or varying frequency or an arbitrary but known waveform. In addition, the first control signal 54 may introduce control or timing parameters such as filtering the communications signal 26 over a certain time period or controlling the response time over which the comparator 42 functions. The comparator 42 may include analog active and/or passive electronic circuitry, such as operational amplifiers, filters, and the like, or combinations thereof.

The mixer 44 generally mixes or multiplies two or more signals to produce an output that includes both the sum and the difference of the frequencies of the input signals. Thus, the mixer 44 may change or shift the frequency of a signal. The mixer 44 may include analog active and/or passive electronic circuitry. The mixer 44 may further include filtering circuitry to filter out by-product or undesirable frequencies. The mixer 44 may receive the difference signal 52 as a first input and an optional second control signal 56 as a second input and may produce a mixed signal 58 as an output. In some embodiments, the second control signal 56 may be the same signal as the first control signal 54. In other embodiments, the second control signal 56 may be a separate signal from the first control signal 54 but may have similar features. If the second control signal 56 is not utilized, then the difference signal 52 may pass through the mixer 44 to the output.

The monotonic transfer function component 46 generally produces a magnitude or norm of a signal by applying a monotonic transfer function such as an exponential function or a logarithmic function that may have a filtering effect. The monotonic transfer function component 46 may also form a second subsystem. The monotonic transfer function component 46 may include analog active and/or passive electronic circuitry. The monotonic transfer function component 46 may receive the mixed signal 58 from the mixer 44.

The latched integrator 48 generally reduces the amplitude of transient characteristics of the signal from the monotonic transfer function component 46. The latched integrator 48 may also form a third subsystem. The latched integrator 48 may control the rate at which the signal from the monotonic transfer function component 46 is tracked. The latched integrator 48 may also receive, or be configured with, timing information regarding the structure of the packets or payloads of the communications signal 26. Each packet may include a header portion and a data portion. The function of the latched integrator 48 may change depending on the portion of the packet being processed. For example, the latched integrator 48 may provide greater suppression of the transient characteristics during the data portion of the packet than during the header portion of the packet. The latched integrator 48 may include analog active and/or passive electronic circuitry that performs an integrating function. The latched integrator 48 produces the impulse filtered signal 50, which serves as the output of the impulsive noise filter 36 and is fed back to the comparator 42.

The components of the impulsive noise filter 36 may also perform any one of the following functions: multimodal pulse shaping, analog rank filtering, offset rank ordering, analog counting, clustering, singular value decomposition, principal component analysis, or independent component analysis.

The linear filter 38 generally filters non-impulsive noise that may be stationary or periodic in nature in the communications signal 26. The linear filter 38 may be a low-pass filter, a band-pass filter, a high-pass filter, or combinations thereof and may include analog active and/or passive filtering circuitry. The linear filter 38 receives the communications signal 26 as an input and outputs a linear filtered signal 60, which may include the communications signal 26 plus impulsive noise but not other types of noise.

The subtractor 40 generally determines the difference between two input signals and may include analog active and/or passive electronic circuitry, such as operational amplifiers, comparators, and the like. The subtractor 40 may also include adder circuitry wherein one of the adder inputs is inverted. The subtractor 40 may receive the linear filtered signal 60 as a first input and the impulse filtered signal 50 as a second input and may produce the impulse signal 28 as an output. Since the impulse filtered signal 50 may be the communications signal 26 without impulsive noise and the linear filtered signal 60 may be the communications signal 26 with impulsive noise, the difference between the two (the impulse signal 28) may be the impulsive noise that has been added to or injected in the communications signal 26.

The integrator 14 generally integrates a signal to determine the energy or the power of the signal and may include analog active and/or passive electronic circuitry that performs an integrating function. The impulse signal 28 may be squared before being integrated to produce a positive waveform. Thus, the integrator 14 may include rectifying circuitry or circuitry to square a signal. The integrator 14 may receive the impulse signal 28 as an input and may produce the impulse power signal 30 as an output, which is a measure of the power of the impulsive noise on the communications signal 26.

The first comparator 16 generally determines the timing of a signal and may include analog active and/or passive electronic circuitry, such as operational amplifiers, filters, and the like, or combinations thereof. The first comparator 16 may receive the impulse signal 28 as a first input and a first reference 62 as a second input and may output the impulse timing signal 32. The first reference 62 is generally a voltage reference which may be static and constant or dynamic and adjustable or variable. The first reference 62 may be supplied from within the system 10 or external to the system 10. The impulse timing signal 32 may include or indicate the time for which the level or amplitude of the impulsive noise is above the value of the first reference 62.

The bimodal pulse shaper 18, the second comparator 20, the third comparator 22, and the AND gate 24 in combination generally detect the peak value of the impulse signal 28.

The bimodal pulse shaper 18 generally shapes the pulse of a signal and may include analog active and/or passive electronic circuitry. The bimodal pulse shaper 18 may receive the impulse signal 28 as an input and produce a shaped impulse signal 64 as an output. The shaped impulse signal 64 may be shaped to include two waveform components such that one of the components is a derivative or partial derivative of the other.

The second comparator 20 and the third comparator 22 may be substantially the same in structure and function as the first comparator 16. The second comparator 20 may receive the shaped impulse signal 64 as a first input and a second reference 66 as a second input. The second reference 66 may be similar in nature to the first reference 62, although in various embodiments, the second reference 66 may be coupled to electrical ground (GND). The second comparator 20 may compare the shaped impulse signal 64 and the second reference 66 and may output a signal that indicates when the level of the shaped impulse signal 64 is greater than the level of the second reference 66.

The third comparator 22 may receive the impulse signal 28 as a first input and a third reference 68 as a second input. The third reference 68 may be similar to the first reference 62. The third comparator 22 may compare the impulse signal 28 and the third reference 68 and may output a signal that indicates when the level of the impulse signal 28 is greater than the level of the third reference 68.

The AND gate 24 generally determines when two inputs are both greater than a certain value and may include digital and/or analog electronic circuitry. The AND gate 24 receives the output of the second comparator 20 as a first input and the output of the third comparator 22 as a second input. The AND gate 24 outputs the impulse peak signal 34 corresponding to when the peak of the impulsive noise is positive and greater than a certain value determined by the third reference 68.

The system 10 may operate as follows. The system 10 may receive the communications signal 26 from the central office of a service provider such as a telecommunications company. The communications signal 26 may be transmitted over telecommunications wiring networks that include twisted pair wiring. In addition, the communications signal 26 may include DSL packet-based protocols. The communications signal 26 may also be subjected to impulsive noise which becomes a component of the signal.

The impulsive noise filter 36 receives the communications signal 26 and filters out the impulsive noise components to produce the impulse filtered signal 50. The linear filter 38 also receives the communications signal 26 and filters out the non-impulsive noise components to produce the linear filtered signal 60. The subtractor 40 receives the impulse filtered signal 50 and the linear filtered signal 60. The subtractor 40 subtracts one from the other to produce the impulse signal 28 which may include the impulsive noise that has been added to or injected in the communications signal 26.

The integrator 14 may receive the impulse signal 28 and may integrate the signal over time to determine the power of the impulsive noise. The integrator 14 may output the impulse power signal 30.

The second comparator 20 may receive the impulse signal 28 and may compare it with the first reference 62 to determine the timing of the impulsive noise. The second comparator 20 may output the impulse timing signal 32.

The bimodal pulse shaper 18 receives the impulse signal 28 and supplies a shaped waveform, the shaped impulse signal 28, to the second comparator 20 that compares it to the second reference 66 which is typically electrical GND. The third comparator 22 receives the impulse signal 28 and compares it to the third reference 68. The outputs of the second comparator 20 and the third comparator 22 may be compared to one another by the AND gate 24. When the outputs are both positive, the AND gate may output the impulse peak signal 34, which indicates the peak of the impulsive noise of the communications signal 26.

The impulse signal 28, the impulse power signal 30, the impulse timing signal 32, and the impulse peak signal 34 may all be communicated to an external system that may record and store the signals. The external system may also analyze and display the signals. Based on the analysis, the source, or sources, of the impulsive noise may be identified and possibly shielded, filtered, or eliminated.

Figure 4:
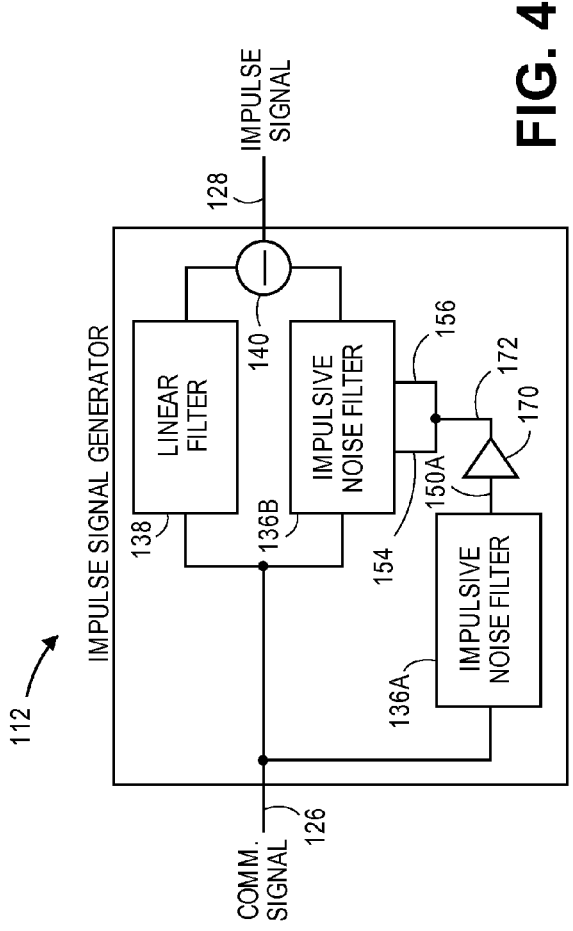
FIG. 4 is a schematic block diagram of a second embodiment of the impulse signal generator.

A second embodiment of the impulse signal generator 112 is shown in FIG. 4 and may include a first impulsive noise filter 136A, a second impulsive noise filter 136B, a variable gain amplifier 170, the linear filter 138, and the subtracter 140. The impulse signal generator 112 may also have a communications signal 126 as an input and an impulse signal 128 as an output.

The first impulsive noise filter 136A and the second impulsive noise filter 136B are substantially the same as the impulsive noise filter 36 discussed above. The first impulsive noise filter 136A receives the communications signal 126 as an input and outputs a first impulse filtered signal 150A, which may be amplified by the variable gain amplifier 170.

The variable gain amplifier 170 generally provides variable amplification of a signal and may include analog active and/or passive electronic single-stage or multi-stage amplifier circuitry. The variable gain amplifier 170 receives the first impulse filtered signal 150A from the first impulsive noise filter 136A as an input and outputs an amplified impulse filtered signal 172.

The second impulsive noise filter 136B receives the communications signal 126 as an input and outputs a second impulse filtered signal 150B. The second impulsive noise filter 136B also receives the amplified impulse filtered signal 172 for the first control signal 154 and the second control signal 156. In some embodiments, the amplified impulse filtered signal 172 may couple to either the first control signal 154 or the second control signal 156.

The linear filter 138 and the subtractor 140 may be substantially the same as the linear filter 38 and the subtractor 40, respectively, discussed above. The impulse signal generator 112 may function in a similar manner to the impulse signal generator 12 discussed above. However, having the first impulsive noise filter 136A supply the first and second control signals 154, 156 to the second impulsive noise filter 136B helps the second impulsive noise filter 136B filter the impulsive noise when the impulsive noise has greater dynamic characteristics, such as variations in the signal-to-noise ratio (SNR) or wider swings in amplitude wherein the impulsive noise may have an amplitude in the range from microVolts (µV) to Volts (V).

Figure 5:
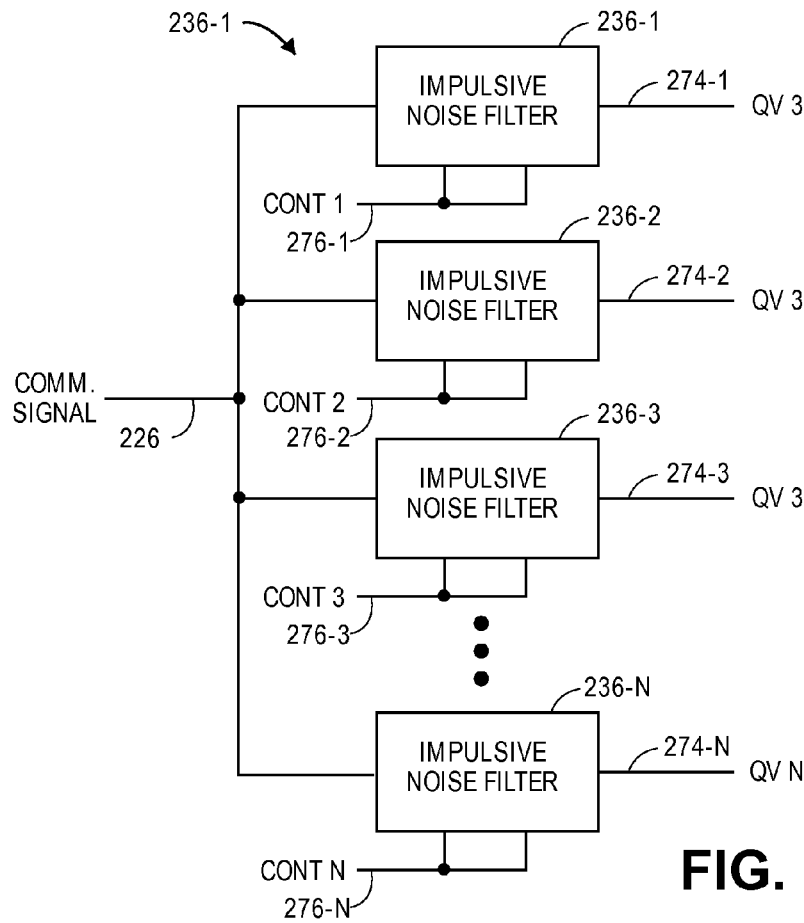
FIG. 5 is a schematic block diagram of a system for determining an impulsive noise probability density function, as constructed in accordance with various embodiments of the current invention.

A system 200 for generating an impulsive noise probability density function, constructed in accordance with various embodiments of the current invention, is shown in FIG. 5. The system 200 broadly comprises a plurality of impulsive noise filters 236-1 - 236-N.

Each impulsive noise filter 236 may be substantially the same as the impulsive noise filter 36 discussed above. Each impulsive noise filter 236 may receive a communications signal 226 as an input and may output a quantile value signal 274, such that the system 200 includes quantile value signals 274-1-274-N. Each impulsive noise filter 236 may also receive a control signal 276 such that the system receives control signals 276-1-276-N. For each impulsive noise filter 236, the control signal 276 may couple to both the first control signal 254 and the second control signal 256 of the impulsive noise filter 236 in some embodiments. In other embodiments, the control signal 276 may couple to either the first control signal 254 or the second control signal 256. The control signal 276 may generally be a known reference signal from within the system 10 or generated external to the system 10, and it may have a fixed value or a variable value.

Figure 6:
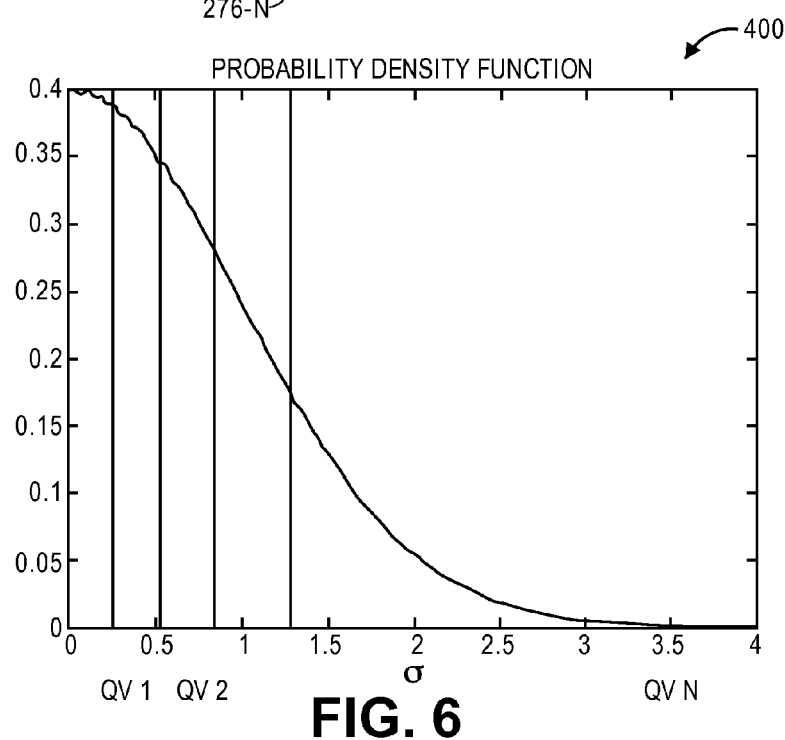
FIG. 6 is a plot of a probability density function of an impulsive noise signal.

The control signal 276 may set the level of impulsive noise at which the quantile value signal 274 is asserted for each impulsive noise filter 36. For example, a first control signal 276-1 may be configured to cause a first impulsive noise filter 236-1 to assert its quantile value signal 274-1 when the level of the impulsive noise is above 200 mV. A second control signal 276-2 may be configured to cause a second impulsive noise filter 236-2 to assert its quantile value signal 274-2 when the level of the impulsive noise is above 400 mV. And so forth with the other impulsive noise filters 236. These outputs may be communicated to an external system for analysis and review. From these outputs, a probability density function of the impulsive noise of the communications signal 226 can be developed in continuous, real time, as shown in a plot 400 in FIG. 6. The plot 400 shows an exemplary probability density function of the impulsive noise along with an indication of the probabilities of the impulsive noise having the value indicated by the various quantile value signals 274-1 - 276-N. The outputs of the system 200 can also be used to determine a cumulative distribution and a quantization of the impulsive noise in continuous, real time as well.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system configured to classify impulsive noise in a communications signal, the system comprising:
   an impulse signal generator configured to receive a communications signal comprising impulsive noise, the impulse signal generator configured to isolate the impulsive noise and output the isolated impulsive noise;
   an integrator configured to receive the isolated impulsive noise, the integrator configured to integrate the isolated impulsive noise, and, based on integrating the isolated impulsive noise, to provide a signal that indicates a power of the isolated impulsive noise;
   a first comparator configured to receive the isolated impulsive noise, the first comparator configured to compare the isolated impulsive noise to a first reference signal, and indicate a time during which a value of the isolated impulsive noise is greater than a value of the first reference signal; and
   an impulse peak detector configured to receive the isolated impulsive noise, the impulse peak detector configured to process the isolated impulsive noise, compare the processed signal to a second reference signal, and detect a peak value of the isolated impulsive noise,
   wherein the impulse peak detector comprises:
   a bimodal pulse shaper configured to receive the isolated impulsive noise, the bimodal pulse shaper configured to shape the isolated impulsive noise and produce an output waveform that includes two components;
   a second comparator configured to receive the output waveform and the second reference signal, the second comparator configured to compare the output waveform to the second reference signal and provide a first output;
   a third comparator configured to receive the isolated impulsive noise and a third reference signal, the third comparator configured to compare the output waveform to the second reference signal and provide a second output; and
   an AND gate configured to receive the first output and the second output, the AND gate configured to provide an impulse peak signal indicating the peak value of the isolated impulsive noise.

2. The system of claim 1, wherein the impulse signal generator comprises:
   an impulsive noise filter configured to receive the communications signal, the impulsive noise filter configured to filter out the impulsive noise included in the communications signal and provide an impulse filtered signal that excludes the impulsive noise, a linear filter configured to receive the communications signal, the linear filter configured to filter out non-impulsive noise included in the communications signal and provide a linear filtered signal that excludes the non-impulsive noise, and a subtractor configured to receive the impulse filtered signal that excludes the impulsive noise and the linear filtered signal that excludes the non-impulsive noise, the subtractor configured to provide the isolated impulsive noise as being the difference between the impulse filtered signal and the linear filtered signal.

3. The system of claim 2, wherein the impulsive noise filter comprises:

a comparator configured to receive the communications signal, the impulse filtered signal, and a first control signal, the comparator configured to compare the communications signal and the impulse filtered signal that excludes the impulsive noise and provide a difference signal, a mixer configured to receive the difference signal and a second control signal, the mixer configured to change the frequency of the difference signal and provide a mixed signal, a monotonic transfer function component configured to receive the mixed signal, the monotonic transfer function component configured to determine the magnitude of the mixed signal and provide a transfer function signal, and a latched integrator configured to receive the transfer function signal, the latched integrator configured to suppress transient characteristics of the transfer function signal and provide the impulse filtered signal that excludes the impulsive noise.

4. The system of claim 3, wherein the comparator is configured to receive a parameter from the first control signal that determines a time period over which the comparator filters the communications signal.

5. The system of claim 3, wherein the comparator is configured to receive a parameter from the first control signal that determines a response time during which the comparator functions.

6. The system of claim 3, wherein the mixer is configured to receive a parameter from the second control signal that determines a frequency of the difference signal.

7. The system of claim 3, wherein the monotonic transfer function component is further configured to apply a monotonic function to the mixed signal.

8. The system of claim 7, wherein the monotonic function is an exponential function.

9. The system of claim 7, wherein the monotonic function is an logarithmic function.

10. The system of claim 3, wherein the communications signal is packet-based and includes a header portion and a data portion and the latched integrator suppresses the transient characteristics of the data portion more so than it does the header portion.

11. The system of claim 2, wherein the linear filter is a lowpass filter.

12. The system of claim 3, wherein the impulse signal generator further comprises:

an impulsive noise pre-filter configured to receive a communications signal, the impulsive noise pre-filter configured to filter out the impulsive noise included in the communications signal and provide a first impulse filtered signal that excludes the impulsive noise, and a variable gain amplifier configured to receive the first impulse filtered signal, the variable gain amplifier configured to amplify the first impulse filtered signal and provide an amplified impulse filtered signal to the first control signal and the second control signal of the impulsive noise filter.

13. The system of claim 1, wherein the impulse signal generator comprises:

an impulsive noise filter configured to receive the communications signal, the impulsive noise filter configured to filter out the impulsive noise included in the communications signal and provide an impulse filtered signal that excludes the impulsive noise, a linear filter configured to receive the communications signal, the linear filter configured to filter out non-impulsive noise included in the communications signal and provide a linear filtered signal that excludes the non-impulsive noise, and a subtractor configured to receive the impulse filtered signal that excludes the impulsive noise and the linear filtered signal that excludes the non-impulsive noise, the subtractor configured to provide the isolated impulsive noise being the difference between the impulse filtered signal and the linear filtered signal.

14. The system of claim 13, wherein the impulsive noise filter comprises:

a comparator configured to receive the communications signal, the impulse filtered signal that excludes the impulsive noise, and a first control signal, the comparator configured to compare the communications signal and the impulse filtered signal and provide a difference signal, a mixer configured to receive the difference signal and a second control signal, the mixer configured to change the frequency of the difference signal and provide a mixed signal, a monotonic transfer function component configured to receive the mixed signal, the monotonic transfer function component configured to determine the magnitude of the mixed signal and provide a transfer function signal, and a latched integrator configured to receive the transfer function signal, the latched integrator configured to suppress transient characteristics of the transfer function signal and provide the impulse filtered signal that excludes the impulsive noise.

* * * * *

UNITED STATES PATENT AND TRADEMARK OFFICE
CERTIFICATE OF CORRECTION

PATENT NO. : 10,128,905 B2
APPLICATION NO. : 13/927387
DATED : November 13, 2018
INVENTOR(S) : Alain Charles Briancon et al.

It is certified that error appears in the above-identified patent and that said Letters Patent is hereby corrected as shown below:

In the Claims

In Claim 8, Column 11, Line 48 (approx.), delete "claim7," and insert -- claim 7, --, therefor.

Signed and Sealed this
Twenty-second Day of January, 2019

Andrei Iancu
*Director of the United States Patent and Trademark Office*